June 25, 1957 H. R. DOORENBOS 2,796,610
ANTI-GLARE SPECTACLES
Filed Jan. 22, 1954
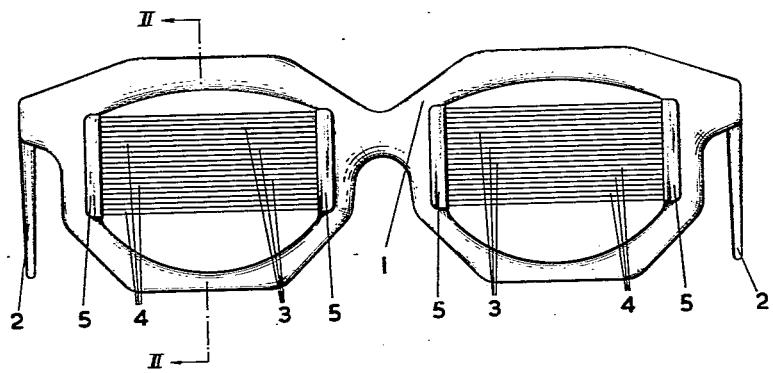
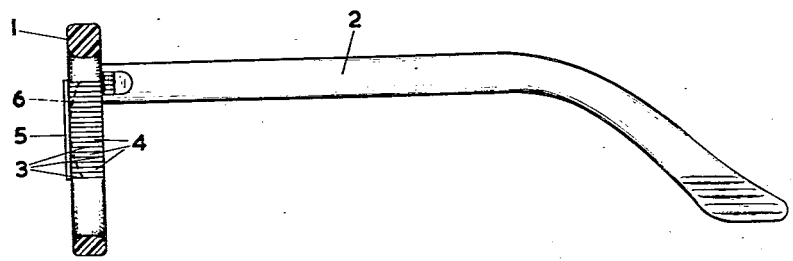
INVENTOR.
HUMPHREY RENE DOORENBOS

United States Patent Office 2,796,610
Patented June 25, 1957

2,796,610
ANTI-GLARE SPECTACLES

Humphrey René Doorenbos, Rijswijk, Netherlands

Application January 22, 1954, Serial No. 405,628

1 Claim. (Cl. 2—14)

The present invention relates to anti-glare spectacles, more particularly for motorists, motorcyclists, cyclists and other users of the road.

Anti-glare spectacles are already known in which in the spectacle frame having round rims limiting the vision on either side, flat strips adapted to pivot about their axes are mounted, which strips are so interspaced that a screening can be obtained by turning the strips into the required position, which, however, is impractical and in many cases even unfeasible under the rapidly varying conditions of road traffic.

In another known type of anti-glare spectacles flat strips are mounted substantially horizontally in a pair of polygonal rims of a spectacle frame, a free space being left in the centre of said rims by locally omitting some strips, so that in said centre a protection against dazzling e. g. by the headlights of oncoming cars, is not obtained.

Furthermore spectacles are known in which small rectangular cells are formed within the rims of the spectacle frame by intersecting horizontal and vertical flat strips, said spectacles being meant in the first place to protect the user's eyes against suspended particles or pieces of flying matter in workshops or the like and, incidentally, against excessive and injurious light rays. However, these spectacles cannot serve as anti-glare spectacles for motorists and other users of the road.

In deviation from the known anti-glare spectacles mentioned hereinbefore, the spectacles according to this invention are characterized in that they have an elongated rectangular framework arranged across the middle portion of ech rim over the full width thereof, the vertical sides of said framework being provided with horizontal grooves in which flat opaque strips having a light absorbent surface are mounted at interspaces not exceeding 1.5 mm., a free space being left in each rim above and below the middle portion occupied by said framework.

By the invention anti-glare spectacles are obtained which provide a wide field of vision both in horizontal direction, in the two lateral and in upward and downward directions, by means of which spectacles the user—by a slight reflex movement of the head—may screen the eyes from the rays originating from any source of light.

The invention will now be nearer explained and illustrated with reference to the accompanying drawing showing an embodiment of such a pair of anti-glare spectacles.

In said drawing:

Fig. 1 is a front view of a pair of anti-glare spectacles according to the invention;

Fig. 2 shows a section of said spectacles on line II—II in Fig. 1.

In the rim 1 of the spectacle frame which frame also comprises temples 2, thin flat strips 3 are mounted, which form slits 3 affording an unobstructed view.

The thin flat strips 3 made from opaque material having a light absorbing non-reflecting surface are secured in grooves, arranged opposite one another in pairs in the strip holders 5 which, together with the strips, form a rectangular framework.

Above and below said framework open spaces are left which are surrounded by the rims of the spectacle frame.

The dotted line 6 shown in Figure 2 represents an example of a convex-shaped profile of the strips which results if the width of the strips is stepwise increased and decreased respectively from top to bottom.

I claim:

An anti-glare spectacles for motorists having two rims connected by a nose piece and temples for engagement behind the ears, each rim having parallel vertical side edges, that improvement comprising an elongated rectangular framework arranged across the middle portion of each rim over the full width thereof, the framework having vertical sides coincident with the side edges of the rims and provided with horizontal grooves and a plurality of flat opaque strips having a light absorbent surface mounted in said grooves to extend horizontally across the full width of the rims at spaces not exceeding 1.5 mm., said framework being positioned toward the upper portion of said rims, a free space being left in each spectacle rim below the middle portion occupied by said frame.

References Cited in the file of this patent

UNITED STATES PATENTS

| 1,089,539 | Driver | Mar. 10, 1914 |
| 1,605,418 | Wittkopf | Nov. 2, 1926 |
| 2,209,579 | Rooney | July 30, 1940 |

FOREIGN PATENTS

| 591,231 | Germany | Jan. 18, 1934 |
| 876,740 | Germany | May 18, 1953 |
| 508,388 | Great Britain | June 30, 1939 |